United States Patent [19]

Dahlin

[11] Patent Number: 4,984,472
[45] Date of Patent: * Jan. 15, 1991

[54] APPARATUS FOR MASS FLOW RATE AND DENSITY MEASUREMENT

[75] Inventor: Erik B. Dahlin, San Jose, Calif.

[73] Assignee: Exac Corporation, San Jose, Calif.

[*] Notice: The portion of the term of this patent subsequent to Dec. 8, 2004 has been disclaimed.

[21] Appl. No.: 128,954

[22] Filed: Dec. 4, 1987

Related U.S. Application Data

[63] Continuation-in-part of Ser. No. 775,739, Sep. 13, 1985, Pat. No. 4,711,132, which is a continuation-in-part of Ser. No. 616,808, Jun. 4, 1984, abandoned.

[51] Int. Cl.$^5$ .............................................. G01F 1/84
[52] U.S. Cl. .............................................. 73/861.38
[58] Field of Search .................. 73/861.37, 861.38; 364/510

[56] References Cited

U.S. PATENT DOCUMENTS

| 4,127,028 | 11/1978 | Cox et al. | 73/861.38 |
| 4,622,858 | 11/1986 | Mizerait | 73/861.38 |
| 4,660,421 | 4/1987 | Dahlin et al. | 73/861.38 |
| 4,711,132 | 12/1987 | Dahlin | 73/861.38 |
| 4,756,197 | 7/1988 | Herzl | 73/861.88 |
| 4,756,198 | 7/1988 | Levien | 73/861.38 |

OTHER PUBLICATIONS

Micro Motion Instruction Manual pp. 8 and 13, published 9/83.

Primary Examiner—Herbert Goldstein
Attorney, Agent, or Firm—Rosenblum, Parish & Bacigalupi

[57] ABSTRACT

A Coriolis mass flow rate measuring apparatus including one or more detecting means (46), (48), (56) for detecting conduit detection portion velocities caused by Coriolis forces exerted by a mass flowing through the oscillating conduit, and means (54) operative to measure the time differences between said first and second points in time when respective velocity signals have zero velocity and to use such measurements according to the formula $$M_p \frac{d^2(Z - Z_D)}{dt^2} + A \frac{d(Z - Z_D)}{dt} + B(Z - Z_D) = P_{\frac{1}{2}} \text{ loop}$$

to indicate the mass flow rate.

6 Claims, 7 Drawing Sheets

FIG_1

FIG_2

FIG_3

APPARATUS FOR MASS FLOW RATE AND DENSITY MEASUREMENT

This is a continuation-in-part of application Ser. No. 775,739, filed Sept. 13, 1985, now U.S. Pat. No. 4,711,132, which is a continuation-in-part of application Ser. No. 616,808, filed June 4, 1984, abandoned, both of which are assigned to the assignee of this application.

BACKGROUND OF THE INVENTION

1. Field of the Invention

The present invention relates generally to mass flow rate meters, and more particularly to an improved meter using Coriolis effects for measuring mass flow rates.

2. Description of the Prior Art

There has long been a need for more accurate and efficient meters for determining the mass flow rate of fluids and/or solids flowing through a pipeline or conduit. Gyroscopic or Coriolis effect type mass flow rate meters are known in the prior art. For example, U.S. Pat. No. 4,109,524 to James E. Smith for "Method and Apparatus for Mass Flow Rate Measurement" discloses a Coriolis effect meter wherein a straight conduit has first and second sections which are reciprocated by mechanical force applied through a parallelly disposed beam with its ends mechanically linked to the two sections' adjacent inside ends, which are also connected to each other through a flexible coupling. The outside ends of the two sections are fixedly supported on a base. The reciprocating forces are in addition to the Coriolis forces separately developed in opposite directions in the two sections. This induces, about the center of the beam, a moment which is measured by a torque sensor when driving acceleration forces are zero at the maximum angular velocity of the sections. This maximum velocity measurement can be complicated by spurious seismic, vibrational, or other forces which may be received through the support structure, and need to be minimized or avoided. Similar meters are disclosed in the U.S. Pat. Nos. to Wiley et al. 3,080,750; Sipin 3,218,851 and 3,329,019; and Souriau 3,396,579.

Rather than using linear sections of conduit reciprocated at adjacent ends, mass flow meters also use a curved or U-shaped tube having inlet and outlet leg ends fixed to a base, and having a bight end which is reciprocated so that corresponding side leg portions' differential displacements caused by Coriolis forces can be measured to indicate the rate of mass flow through the tube. Such a technique is suggested by Smith in U.S. Pat. Nos. '524 and 4,187,721, now RE 31,450, in which a U-shaped conduit mounted as a beam which, while driven in a no-flow condition, bends without torsional forces Thus, the torsional forces distorting or twisting the U-shaped conduit can only result from the Coriolis forces. An oscillating means, mounted on a spring arm with a natural frequency substantially equal to that of the U-shaped conduit, reciprocates the center of the loop's bight end up and down. Sensors detect the leading and trailing leg passages through the U-tube's static or oscillation midplane. According to the '450 Patent, measuring the midplane passage time difference indicates the mass flow rate while minimizing measurement of inertial acceleration and other forces resulting from oscillating the conduit: "[R]ather than compromising the accuracy of the flow meters by measuring but one of the opposing forces, the method and apparatus of the present ['450] invention is specifically structured to minimize or obviate the forces generated by the two non-measured opposing forces, i.e., velocity drag and acceleration of mass. This effort has been successful to the point where such forces are present in cumulative quantities of less than 0.2% of the torsional spring force." (col. 3, lines 5514 62). The Smith '450 patent assignee, Micro Motion, reiterates the importance of the midplane measurement and the importance of minimizing non-measured forces in its Model C Instruction Manual (page 9): "An important feature of the detection system is that deflection angle measurements are made near the center position of the tube travel, where the tube velocity and the deflection angle are the greatest. Also, at that position the angular acceleration of the tube is nearly zero, so any imbalance in the tube assembly is least likely to cause an angular deflection which might be interpreted as a flow signal." Smith U.S. Pat. No. 4,422,338 teaches a similar structure in which a pair of velocity sensors provide output signals linearly representative of the tube's actual motion, and in which electronics are provided to integrate velocity signals into position signals to permit measurement of the time difference of the side legs' passages through the oscillation midplane, or through some other selected spatial location.

In U.S. Pat. No. 4,127,028 to Bruce M. Cox for "Coriolis Mass Flow Rate Metering Means", a pair of generally U-shaped tubes are spaced apart in parallel with their inlet and outlet ends fixedly cantilever-mounted and with their respective bight ends free to move relative to each other. The tubes' respective bight ends are connected by a drive mechanism which oppositely reciprocates the tubes like tines of a tuning fork. Mass flow rate is detected by photodetectors as in the single tube embodiment of Smith '450. Cox observes that the photodetectors could be replaced by strain gauges or velocity sensors, and that the two sensor's outputs are phase shifted in proportion to the Coriolis force couple. The Cox sensors are positioned at the conduits's neutral or at-rest (midplane) position. U.S. Pat. No. 4,127,028 narrows the separation of the support ends of the legs of a U-tube to improve the ease with which the U-tubes twist torsionally in response to Coriolis reactance forces. This reference illustrates a looped tube configuration in FIG. 5, but fails to teach or suggest how such a configuration could enhance mass flow measurements, and therefore is not believed to anticipate the present invention.

U.S. Pat. No. 4,311,054 to Cox and Ho also uses sensors with linear response characteristics in a narrow region about the oscillation midpoint to measure the time difference of opposite sides passing through the loop's static (or oscillation) midplane. Other prior art Coriolis principle meters are taught or cited in the U.S. Pat. Nos. to Barnaby et al. 2,752,173; Roth 2,865,201 and 3,049,919; Sipin 3,355,944 and 3,485,098; Catherall 3,955,401; Shiota 4,381,680; and Smith RE 31,450.

If one were to employ the Smith '338 Smith '450, Cox '054 or Cox '028 teaching with a conduit that is of a non-planar configuration, the technique of measuring the conduit position relative to its rest or oscillation "midplane" position would result in mass flow measurement errors because other forces (in addition to the Coriolis forces) may tend to angularly distort the conduit and thus distort mass flow measurement. Such angular distortions can result from temperature, fluid hydrostatic pressure, or fluid flow induced centrifugal forces. In addition, the driving means or the three-dimensional nature of the conduit can introduce forces which contribute angular distortions about the conduit rest position, which can be misinterpreted as effects of Coriolis forces.

In the Smith '338 Patent if the velocity signals are not highly linear throughout the tubes entire range of motion, significant errors would result in the determination of mass flow rates.

A disadvantage of the Smith and Cox type of prior art mass flow meters is that they are highly sensitive to external vibrations (other than Coriolis forces) which may interfere with accurately measuring mass flow rates.

Another disadvantage of the Smith RE 31,450 and 4,422,338 preferred embodiments is that their methods of measuring U-tube midplane passage times produces errors during changes in the flow density.

Yet another disadvantage of prior art Coriolis type meters is that their sensitivity limits prevent them from providing accurate flow data over wide flow ranges.

Yet another disadvantage of prior art Coriolis type meters is that they incorrectly and only approximately depend upon mass flow rates being directly proportional to differential phase angles or differential time measurements.

A further disadvantage of prior art Coriolis type meters is that sensing-structure temperature changes can cause substantial errors in measuring mass flow rates.

Still another disadvantage of the prior art Smith U.S. Pat. Nos. RE 31,450 and 4,422,338 and Cox, Gonzales U.S. Pat. No. 4,127,028 is that the oscillatory drive motion creates significant bending stresses at the attachment points of the U-tubes, leading to a danger of stress corrosion.

Still another disadvantage of the above prior art meters is that they introduce at least two sharp 90 degree bends in the inlet and outlet portions of the flow meter, causing a greater loss in pressure.

SUMMARY OF THE PRESENT INVENTION

It is therefore a primary object of the present invention to provide a new and improved Coriolis effect type meter for measuring fluid and/or solid mass flow rates through a conduit.

Another object is to provide an improved mass flow rate meter without the need to minimize or avoid non-Coriolis force distortions of the conduit.

Another object is to provide an improved mass flow rate meter without requiring linearly responsive motion sensing pick-ups.

Another object is to measure mass flow rates without limiting the spatial location or reference of the tube position sensing pick-ups.

A further object is to provide a mass flow rate meter without perturbing mechanisms or obstacles in the conduit flow path.

The present invention uses Coriolis forces advantageously to measure mass flow rates accurately and independently of variations of the physical properties of the flowing material, even in the presence of significant non-Coriolis forces.

The present invention in a preferred embodiment includes a conduit configured as at least one helical loop, means for oscillating a loop portion in a direction normal to the direction of flow through that portion and generally parallel to the loop's central axis, and means for detecting Coriolis force effects caused by mass flow through the oscillating portions of the loop. The mass flow rate is measured at the extremes of conduit deflection, without restriction to the oscillation mid-plane or any other predetermined spatial reference, and without requiring linearly responsive motion sensing pick-ups. In the instant invention, drive motion causes torsional stresses which are less concentrated than bending stresses and are absorbed over a certain distance, resulting in a low stress corrosion danger and thereby enhancing safety. The present invention uses loops which have a gradual curvature which results in a low pressure drop.

These and other advantages of the present invention will become apparent to &:hose skilled in the art upon studying the following detailed description of the preferred embodiments and the accompanying drawings.

GENERAL THEORY OF OPERATION

The present invention is based upon the principle that as a mass flowing through an arbitrarily shaped conduit undergoes a velocity gradient transverse to its flow path, the flowing mass exerts on the inside wall of the conduit a force directly related to the transverse velocity gradient and to the mass flow rate. When the velocity gradient is caused by the transverse motion of the conduit or rotation of the conduit about an axis other than the loop conduit's central axis, the reaction force is known as a Coriolis force. The magnitude and direction of the reaction force depends upon the magnitude and direction of the transverse velocity change of the mass flow. Two portions of a conduit having the same transverse velocity gradient, but having opposite directions of flow, create a force couple of equal and opposite reaction forces distributed along the conduit. The present invention measures the result of this force couple to determine the rate of mass flow through the conduit.

Figure 1:
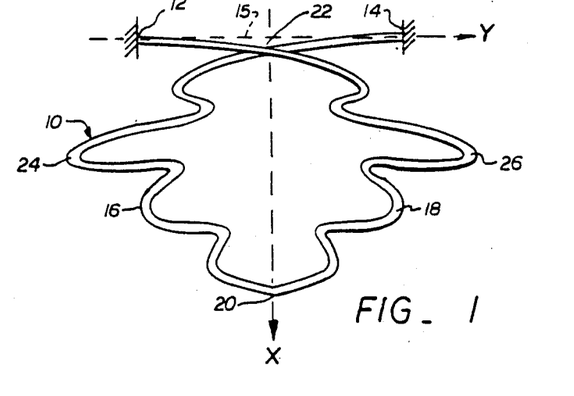
FIG. 1 schematically illustrates the theory of operation of the present invention.

FIG. 1 illustrates a generalized helical loop of conduit 10, the ends of which cross and are mounted in base structures 12 and 14. The following general theory of the present invention applies for any lengthwise shape of conduit with any shape of cross-section.

Conduit 10 may be considered to lie substantially in the X—Y plane only for purposes of simplified mathematical analysis; ignoring conduit deviations in the normal direction along the Z axis. The mass flow and total Coriolis force, $P_{\frac{1}{2}}$loop acting upon the left and right half-loop sections 16 and 18 respectively, is given by the expression $$P_{\frac{1}{2} \, loop} = F_{mass} v_D \qquad (1)$$

where $v_D$ is the velocity along the Z axis at the drive-point of the loop, such as point 20 in FIG. 1 and where $F_{mass}$ is the fluid mass flow.

This equation and another equation (2) presented below can be used with the following approximations to describe the dynamics of a generalized shape length of conduit (1) Instead of being distributed with varying magnitudes along the tube, the Coriolis forces for each half-length are assumed to be lumped at a single "center of action point" where the resultant force of the distributed force for a half-length is applied. This resultant force can be computed from the particular tube geometry and the general Coriolis force formula for individual mass elements (2) Instead of being distributed along the half-lengths, the mass of fluid and tube material for each half-length are lumped in a single "participating mass" point $M_p$ at the center of action point of each half-length. The "participating mass" is approximately the weight of the tubing and the fluid in each half-length, but only for the purpose of simplified analysis ignores the conduit section between the X-axis and the suspension point. The participating mass can be experimentally determined by measuring the bending mode natural frequency of oscillation around the X-axis and by comparing it with the theoretical natural frequency of the differential equation (2) presented below. The participating mass is determined so that the two natural frequencies agree. This concept takes into account that the motion is not uniform for different points on the half-lengths.

Inertial force, damping force and spring action force are related by the differential equation:

$$M_p \frac{d^2(Z - Z_D)}{dt^2} + A \frac{d(Z - Z_D)}{dt} + B(Z - Z_D) = P_{\frac{1}{2} \, loop} \qquad (2)$$

where

A is a damping factor including both natural damping in the material and damping by a coil as described below;

B is the spring factor describing the restoring force from the spring action due to the fixedly attached ends of the tube (10);

$M_p$ is the participating mass for one half of the loop; t is time;

$Z_D$ is the motion of the center of action point due to solely drive motion; and Z is the motion due to drive motion and Coriolis force at the center of action point.

The natural frequency of equation (1) expressed in radians/unit time is $$W_{th} = \sqrt{\frac{B}{M_p}} \qquad (3)$$

The mode of natural oscillation related to equations (2) and (3) is referred to as the "Coriolis mode."

The spring factor B can be determined by static application of a force couple at the center of action points working in opposite direction approximately at the points 24 and 26 of the two sides of the loop 10 in the Z direction, and measuring the deflection of the center of action points.

If loop 10 is excited at point 20 by a force in the Z direction varying sinusoidally with an angular frequency of W, the Coriolis force $P_{178}$ (at constant flow rate) is a sinusoidal signal having the same frequency. Equation (1) approximately determines the Coriolis force magnitude where $V_D$ has a sinusoidal time variation.

The phase shift between $P_{\frac{1}{2}}$loop and $(Z-Z_D)$ in accordance with equation (2) is explained in Grabbe, Ramo, Woodridge, "Handbook of Automation Computation and Control" volume 1, pages 20–59.

Defining the damping coefficient z as $$z = (\tfrac{1}{2} W_{th})(A/M_p) \qquad (4)$$

if, for example, the drive frequency W is chosen as 0.5 times the natural frequency, $W_{th}$, and the damping coefficient z is chosen as 0.01, then using equations (2) and (3) above the phase shift i found to be about $-0.8$ degrees.

In this example, from equation (4) it can be determined that the ratio of damping factor A to mass $M_p$ is $$A/M_p = 0.02 W_{th} \qquad (5)$$

This damping results from the application to the loop 10 of a certain damping force as explained below With the same natural frequency in the Coriolis mode, but with a different amount of damping, or a different selection of drive frequency W, a different phase shift would occur.

DETAILED DESCRIPTION OF THE PREFERRED EMBODIMENTS

The Smith '450 and '338 patents both determine mass flow rates by measuring the time difference of passage of opposite side legs of a U-tube as each side leg passes through the midplane of oscillation (or through some other predetermined spatial reference plane adjacent the midplane). By contrast, the present invention does not measure conduit motion relative to any fixed place, or other pre-determined spatial reference Rather, the present invention determines mass flow rate, in part, by measuring a phase angle difference when two selected portions of the conduit each experience zero relative velocity. The spatial location at which the conduit attains its deflection extreme and zero velocity varies with fluid mass flow rate, density and temperature. Variations in mass flow rate change the Coriolis force which causes the conduit to distort differently. The participating mass $M_p$ of the vibrating conduit varies with fluid density, thereby altering conduit vibrational amplitudes. Additionally, variations in fluid temperature change the "spring constant" of the conduit and hence the amount it deflects in response to Coriolis forces and driving forces. Thus, the spatial location at which the conduit arrives at its deflection extremes and attains zero (relative) velocity varies, is not fixed and cannot be predetermined.

This invention measures the difference $\Delta\theta$ between phase angles of signals from two velocity type sensors and computes mass flow rates according to equations (6) and/or (8) below. Such phase angle differences are measured only when the conduit detection portions' velocities are zero, which occurs at deflection extremes. This occurs when each velocity sensor output is zero if one conduit is employed, or when the relative velocity is zero if two conduits are employed. In contrast with Smith '450 and '338, the present invention measures instants in the conduit oscillation cycle when conduit angular velocities are zero and thus the Coriolis forces are also zero; angular acceleration and inertial forces are at their maximums. The present invention's measurement of conduit motion at the instant of zero (or zero relative) velocity effectively eliminates the previous need to minimize or eliminate other competing non-measured forces as taught by Smith RE 31,450. It is of significant importance that zero (or zero relative) velocity can be determined without regard to linearity of response in the velocity pick-ups, and without regard to the uniformity or non-uniformity of either the magnetic field or the coil of the velocity pick-ups thereby permitting highly accurate measurements of mass flow rates without the linear response limitations taught by Smith '338.

Figure 2:
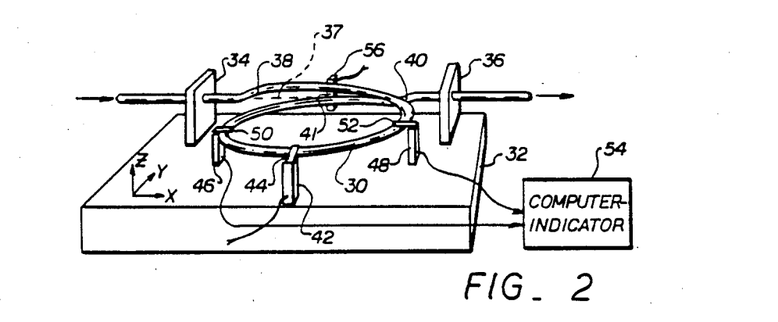
FIG. 2 schematically illustrates a simplified embodiment of the present invention.

FIG. 2 illustrates a simplified embodiment of the present invention in which a circular loop 30 of conduit is mounted by standards or vibration isolation plates 34 and 36 on base 32. Loop 30 is deformed away from pipeline axis 37 upwardly at point 38 and downwardly at point 40 to provide clearance at loop crossover point 41. Alternatively, pipeline axis-matching deformations could be located outside of standards 34 and 36. Diametrically opposite loop cross-over point 41, loop point 44 is electromagnetically coupled to a force-applying armature, or the like, of a loop actuating means 42 also mounted on base 32. Actuating means 42 is of any type suitable for reciprocating the engaged loop portion along the Z-axis, as defined above in equation (2). On each side of loop 30 are disposed velocity sensors 46 and 48 suitable to simultaneously measure the loop point 50 and 52 velocities relative to a base 32, and to communicate these measurements to a computing and indicating means 54 which is in turn suitable to provide (a measurement of the motion resulting from the Coriolis forces, and hence) a measurement of the rate of mass flow through loop 30. A computing means 53 (FIG. 12) would be suitable which first calculated the difference between sensor 46 and 48 signals properly weighted so that their difference is zero at zero mass flow. Alternatively, computing means 53 could be connected to receive signals from a suitable sensor 56 coupled to the crossover point 41 portions of loop 30 and operative to output signals indicative of the two loops' relative velocity to similarly cause indicating means 55 (FIG. 12) to indicate the rate of mass flow through tube 30.

The FIG. 2 embodiment measures the sensor 46 and 48 velocity signals' phase angle difference $\Delta\theta$ at a given signal level which may be the zero signal level. For constant drive frequency, the phase angle difference $\Delta\theta$ is equal to the drive frequency $w_D$ multiplied by the time difference between the waveforms developed by the velocity detectors operating at left and right positions (46 and 48 in FIG. 2, positions 76 and 78 in FIG. 4, or positions 110 and 112 in FIG. 5). See *Electronic and Radio Engineering* by Frederick E. Terman, McGraw-Hill (1955). Phase angle difference detection at zero crossings of waveform signal levels is disclosed in *Applications Handbook of Precision Phase Measurement* (1975) by Dranetz Engineering Laboratories, Inc. of South Plainfield, N.J., and in *Hewlett-Packard Application Note* 200-3 (1974) entitled "Precision Time Interval Measurement Using an Electronic Counter," but there is no suggestion in the prior art of mass flowmeters that it would be desirable to detect zero crossings of velocity waveforms. Indeed, the Smith '450 Patent, in order to minimize the non-measured forces (which is incorporated by reference in Smith '338) teaches detecting only at the zero (midpoint of oscillation) of position signals or position equivalent waveforms, and thus teaches away from measuring zeroes in (relative) velocity.

$F_{mass}$ is calculated by the computing means using the equation $$F_{mass} = \frac{\tan\frac{\Delta\theta}{2}}{2KRw_D\left(\sin\phi - \cos\phi \tan\frac{\Delta\theta}{2}\right)} \quad (6)$$

where $$\theta = \frac{\pi}{2} - \arctan\frac{(2z_c W_D)}{w_c^2 - w_D^2} \quad (7)$$

$$R = \frac{w_c^2}{\sqrt{(w_c^2 - w_D^2)^2 + 4z_c^2 w_D^2}}$$

$w_c$ is the actual natural frequency of the mode excited by Coriolis forces (the Coriolis mode) and corresponds to the theoretical value $W_{th}$ in equation (3); and $z_c$ is the actual damping coefficient for the Coriolis mode and corresponds to the theoretical value $z$ in equation (4). If the damping coefficient $z_c$ is small then equation (6) reduces to $$F_{mass} = \frac{\tan(\Delta\theta/2)}{2KRW_d} \quad (8)$$

K=a conduit "flexibility factor" defining the change in conduit position at one of the velocity sensor locations per unit Coriolis force on the corresponding half-length of conduit. The flexibility factor K is not a constant but rather depends upon the conduit's material, geometrical dimensions, and temperature, because most materials' elasticity (Young's) modulus varies with temperature. Young's modulus change with temperature is tabulated in available literature, or can be determined experimentally.

The preferred embodiment, while measuring mass flow, also measures the tube wall temperature and as will be further described below with reference to FIGS. 12, 13 and 14, uses the temperature in the computing means 53 to recalculate or adjust the current value of flexibility factor K. Each flowmeter design or individual unit is preferably calibrated for the value of K at a given temperature.

Equations (6) and (8) which are more accurate than equations used in the prior art, are derived by solving equation (2) and superimposing the resultant motion upon the driving motion. Equation (2) takes into account the inertial acceleration forces among others that, according to Smith RE 31,450, need to be obviated.

The FIG. 2 embodiment requires a rigid base 32 to support standards 34 and 36, as well as to support actuating mechanism 42 so as to block out reception of any vibrations which might be transmitted from the external pipeline (not shown) and which could interfere with mass flow measurements. Any remaining vibrations which are still transmitted from the external pipeline towards rigid base 32 are passed onward to drive mechanism 42 and thence to velocity sensors 46 and 48. External vibrations do not usually disturb measurement accuracy. Nonetheless, seismic vibrations may move the suspended conduit relative to the base and thereby disturb measurement accuracy However, any seismic motions in the Z direction would be applied equally to the upper and lower detection portions at cross-over points 41, and the two portions would be deflected with the same intensity in the same direction, so seismic disturbances are largely isolated if the velocity detection is at the location of detector 56.

Figure 3:
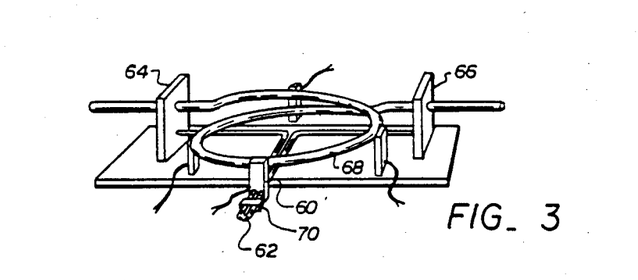
FIG. 3 schematically illustrates a first alternative embodiment of the present invention.

The FIG. 2 embodiment, in which actuating means 42 is mounted directly to base 32, is modified in the FIG. 3 embodiment where actuating means 60 is mounted to a counter-balancing arm 62, which in turn is rigidly attached to standards or vibration isolation plates 64 and 66 Counter-balancing arm 62 is configured to have the same natural resonant frequency about its support axis as the resonant frequency of conduit 68, and furthermore has a slide weight 70 with which arm 62 may be adjusted for different densities of flow through conduit 68. Accordingly, even though rigid end mounts are required in this embodiment, the base does not have to be vibration resistant since it is not attached directly to actuator. 60. Actuator 60-generated vibrations are effectively prevented from propagating into the connected external pipeline (not shown), which might reflect vibration energy back as a source of error in the flow meter.

In the FIG. 2 and 3 embodiments, driver 42 or 60 induced stresses at points where the conduit is attached to standards 34 (64) and 36 (66), are primarily torsional stresses rather than bending stresses Conversely, Coriolis mode forces cause primarily bending stresses at these attachment points.

Figure 7:
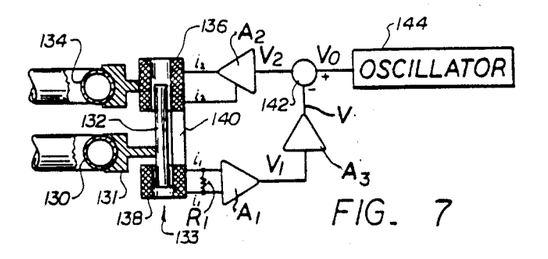
FIG. 7 schematically illustrates one method of applying oscillatory energy to the loop or loops of embodiments of the present invention.
Figure 8:
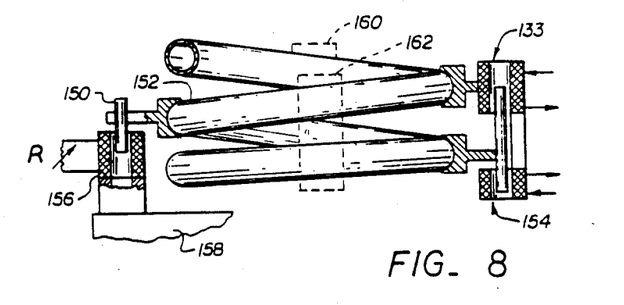
FIG. 8 schematically illustrates a damping technique used with the present invention.

The FIG. 2 drive system 42 may be implemented as illustrated in detail FIG. 7. Any flow tube will exhibit a natural mode of vibration with low damping. Artificial damping and control of the drive may be achieved as illustrated in FIG. 7. A permanent magnet 132 is mounted by a standoff 131 to one conduit segment 130. Attached to the loop directly above, as illustrated by the conduit segment 134, is a double coil mechanism 133 including an upper winding 136 and a lower winding 138 which are mechanically attached to each other by a member 140, but which are electrically isolated from each other. The assembly 133 is mounted relative to magnet 132 such that current through winding 136 applies a motive force to the magnet 132 which drives conduit segment 130 relative to conduit segment 134. Magnet 132 moving within lower coil 138 induces a current $i_1$ signal in proportion to the magnet velocity with respect to the axis of coil assembly 133, i.e., in proportion to the difference between the velocities of detection portions 130 and 134. The current $i_1$ through resistor $R_1$ establishes a voltage which is applied to the inputs of a differential amplifier $A_1$, to generate a voltage $V_1$ signal likewise proportional to the detection portions' velocity difference.

Voltage $V_1$ is fed through amplifier $A_3$ whose output signal V is subtracted by an analog computing device 142 from a suitable periodic voltage signal $V_0$ such as a sine wave generated by an oscillator 144. The $V_0-V=V_2$ difference signal is applied to an amplifier $A_2$ that generates a drive current $i_2$ through the drive coil 136 to produce a magnetic field which causes permanent magnet 132 to oscillate vertically within the winding 136, thereby causing actuated portion 130 to oscillate vertically relative to actuated portion 134. The loops are driven alternately together and apart.

The velocity feedback circuit, including winding 138 and amplifier $A_1$, controls the tube oscillation amplitude at a desirable magnitude, even if the oscillator is operating at or near the natural resonant frequency of the tube. Without this velocity feedback, or some other means for damping, tube oscillations which happened to be at or near the tube's natural frequency could drive the tubes beyond their elastic limits and cause them to fail.

Figure 9:
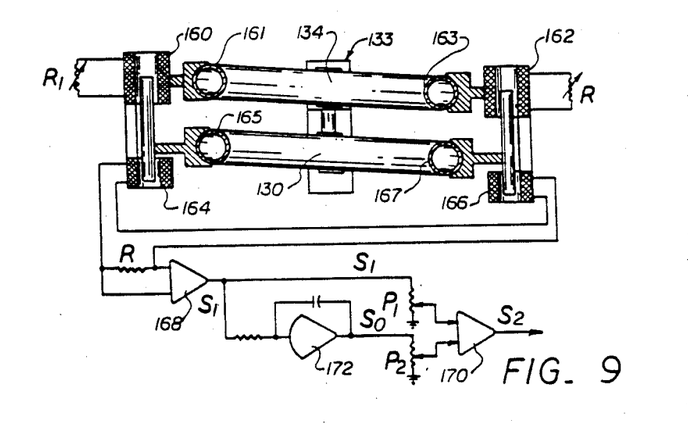
FIG. 9 schematically illustrates a method of detecting the Coriolis influence on multiple loops in accordance with the present invention.

The FIG. 7 closed feedback loop behavior is approximated by the transfer function $$\frac{X}{V_0} = \frac{K_2 K_3}{ms^2 + s[a + KK_1 K_2 K_3 K_4] + b} \quad (9)$$

where
K = velocity feedback loop gain ($V/V_1$),
X = the separation between the tubes at points 161 and 165 in FIG. 9,
$K_1$ is the gain factor ($V_1/i_1$),
$K_2$ is the gain factor ($i_2/V_2$),
$K_3$ is the force between drive coil 136 (FIG. 7) and magnet 132 per unit current $i_2$,
$K_4$ is the magnitude of current $i_1$ per unit velocity difference between drive coil 136 and magnet 132,
s is the Laplace operator symbol,
m is the mass of both tubes 130 and 134 and the fluid contained therein, including only the circular loop portions of the conduits,
a is the damping constant of the structure for the drive motion, and
b is the spring constant of the structure for the drive motion.

The expression $[a+KK_1K_2K_3K_4]$ shows that without the velocity feedback loop the normally small damping constant "a" is enhanced. Gain factors may be selected appropriate to damp the drive amplitude so that velocity signal $V_1$ follows the oscillation signal $V_0$ as desired.

Figure 4:
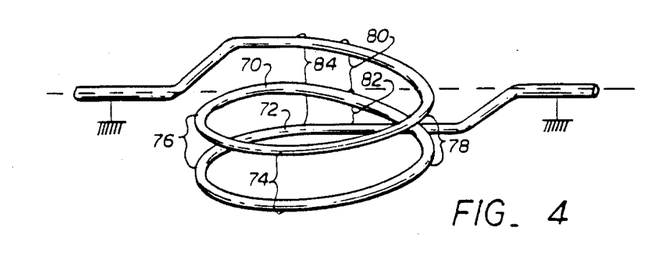
FIG. 4 schematically illustrates a serial flow multiloop embodiment of the present invention.
Figure 5:
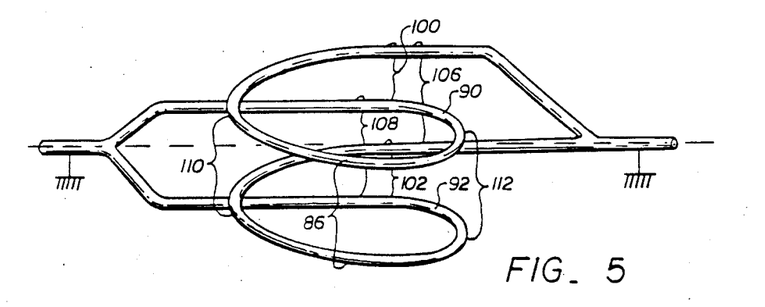
FIGS. 5 and 6 illustrate parallel flow multilooped embodiments of the present invention.
Figure 6:
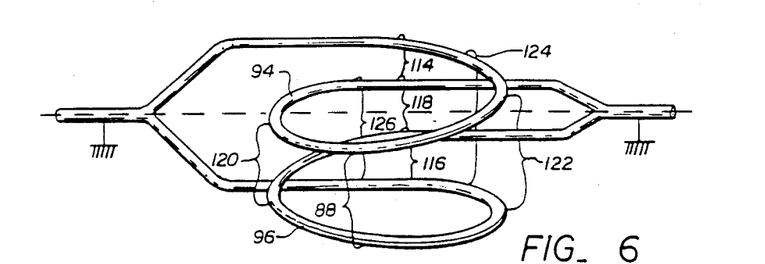

According to the present invention, Coriolis force sensitivity may be increased by utilizing serial and parallel combinations of cross-over loops as illustrated in FIGS. 4–6. In the FIG. 4 serial double-cross-over loop, a drive force can be applied between the respective points 74 of loops 71 and 72 to deflect the two loops in opposite directions. Dynamic changes in relative velocities between respective loop points 76 and respective points 78, or between points 80 and 82, or between loop points 84, can be detected and used to indicate the mass flow rate. The velocities of corresponding portions of an individual loop 71 or 72 relative to a base or other spatial reference can also be detected, as in the embodiment of FIG. 2, and the differences between them used to determine mass flow rate. The FIG. 4 series double-crossover loop structure is especially sensitive to mass flow rates and is suitable for low mass flow rate measurements, but it is also sensitive to external vibrations and requires means for damping, as described below.

In the FIG. 5 parallel loop embodiment, loops 90 and 92 spiral in the same direction, whereas in the FIG. 6 embodiment, with flow left to right, upper loop 94 spirals downward while lower loop 96 spirals upward. Alternatively, with actuating forces applied to the loops between respective points 86 in FIG. 5, or between respective points 88 in FIG. 6, measurements may be taken of the velocities of the portions forming the top gap 100 (114 in FIG. 6) or bottom gap 102 (116), or of the difference between the velocities of the top and bottom gaps. Similarly, the loop point 108 (118), 110 (120) 112 (122) or points 110 and 112, (120 and 122) velocities' can be taken as indicators of the effects of Coriolis forces Measuring the relative velocity between the upper and lower loops on opposite sides is believed to be the measurement mode the most sensitive to mass flow. The loop velocity detection points do not necessarily have to be symmetrically opposite each other or symmetrical about the drive point.

This dynamic measurement applied above to provide accurate measurements of mass flow through the three-dimensional non-planar cross-over loops as depicted in FIGS. 1-6 can also be applied to other conduits having arbitrary shapes which may exhibit substantial torsion or angular deflection in the drive mode. This is in contrast to the teachings of the Smith U.S. Pat. No. Re 31,450 which, in order to measure mass flow rate, requires elimination of nonmeasured forces and teaches that this be accomplished using a planar (i.e. two dimensional) conduit in conjunction with a midplane measurement.

Figures 10A, 10B, 10C, 10D:
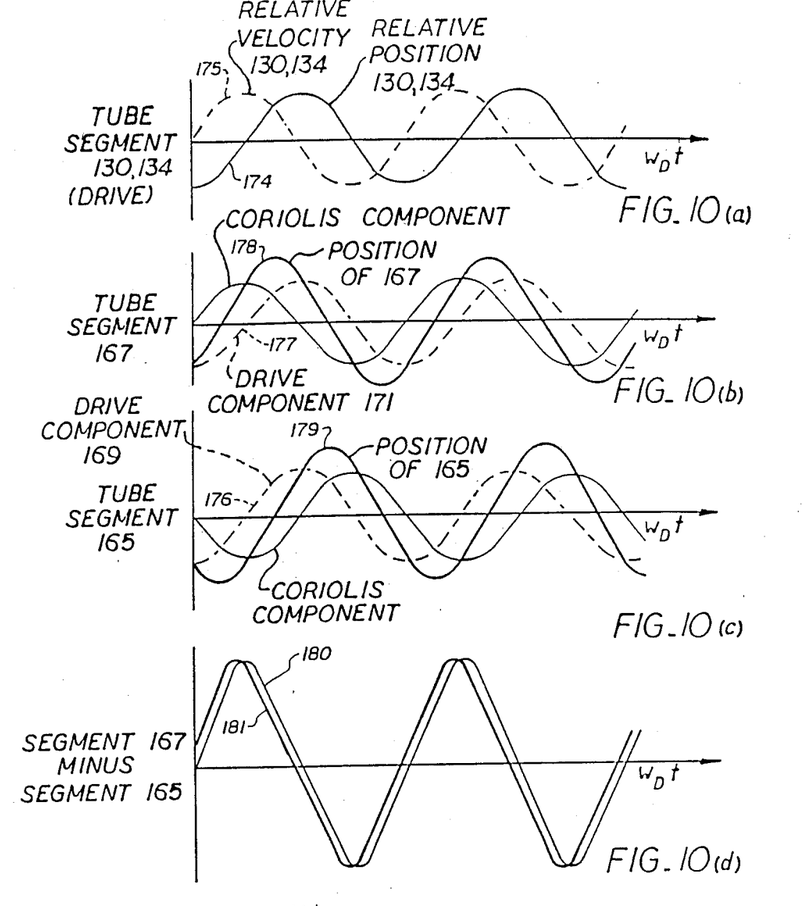
FIGS. 10a–10d are sets of wave forms illustrating operation of the present invention.

Figs 10(a)-14 10(d) and 11 illustrate the relationships between steady state signals with sinusoidal drive velocity for the individual loops position and acceleration with reference to whatever supports the meter, such as base 32 in FIG. 2, and also represent the loop positions' relative separation and velocity as in FIGS. 4-6, where loop behavior is independent of the loop's particular positions with respect to their supports or outside pipes. More particularly, FIG. 10(a) solid line 174 plots the drive position of tubes 130-134, and dashed line 175 plots the corresponding velocity curve. With no flow through the tube, FIG. 9 tube positions 165 and 167 oscillate in phase with the position of tube segment 130, as illustrated by the drive component curve 176 in FIG. 10(c) and curve 177 in FIG. 10(b). Coriolis effect deflections are nearly in-phase with the velocity (i.e. time derivative) of the drive motion, and are positive with respect to tube segment 167 and negative with respect to tube segment 165. The Coriolis components added to the drive component give the positional displacements of tube segments 167 and 165 as illustrated by waveforms 178 and 179 respectively in FIG. 10(b) and FIG. 10(c). In FIG. 10(d), the difference between position curves 165 and 167 is depicted as curve 180 with no apparent phase lag between drive velocity and Coriolis force. In actuality, there is approximately minus one degree of phase lag depending upon drive, "Coriolis mode," natural frequency ratio and damping factors. The magnitude of the Coriolis component 178 (FIG. 10(b)) or 179 (FIG. 10(c)) is very small compared to the respective drive components 171 and 176, and FIG. 10(d) phase lag curve 181 exaggerates the magnitude of the Coriolis component for ease of illustration.

Figure 11:
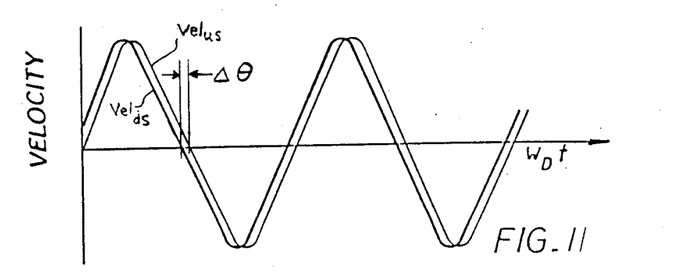
FIG. 11 is a plot of the velocities $Vel_{us}$ of the upstream detection portion and $Vel_{ds}$ of the downstream detection portion showing their output signal phase offset $\Delta\theta$.

FIG. 11 illustrates the phase offset $\Delta\theta$ between the leading velocity $Vel_{us}$ of the upstream detection portion and the lagging velocity $Vel_{ds}$ of the downstream detection portion in any of the above embodiments.

Figure 12:
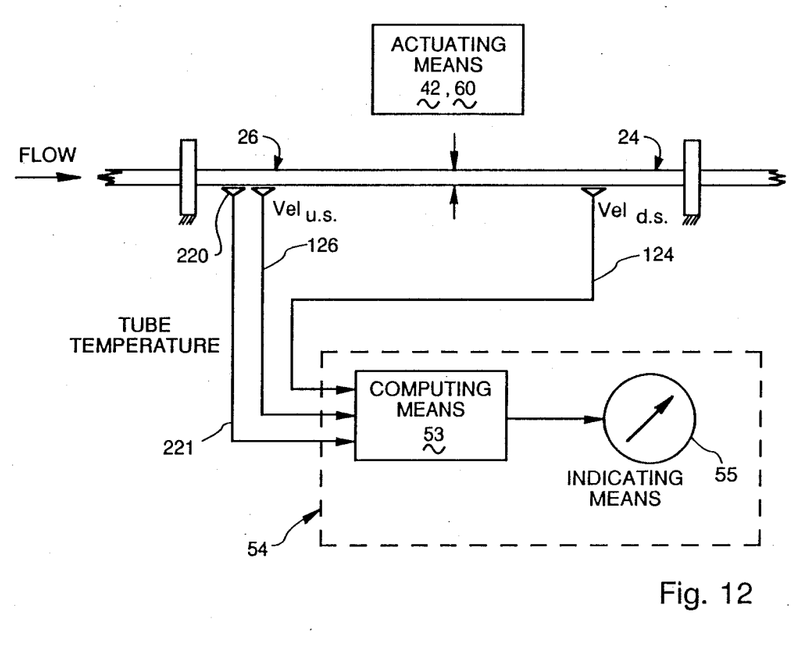
FIG. 12 schematically illustrates thermometer means for measuring tube temperatures and developing temperature signals for use by the computing and indicating means.

FIG. 12 illustrates a generalized embodiment of the invention in which the conduit temperature is measured by thermometer means 220 and communicated via line 221 to computing and indicating means 54.

Figure 13:
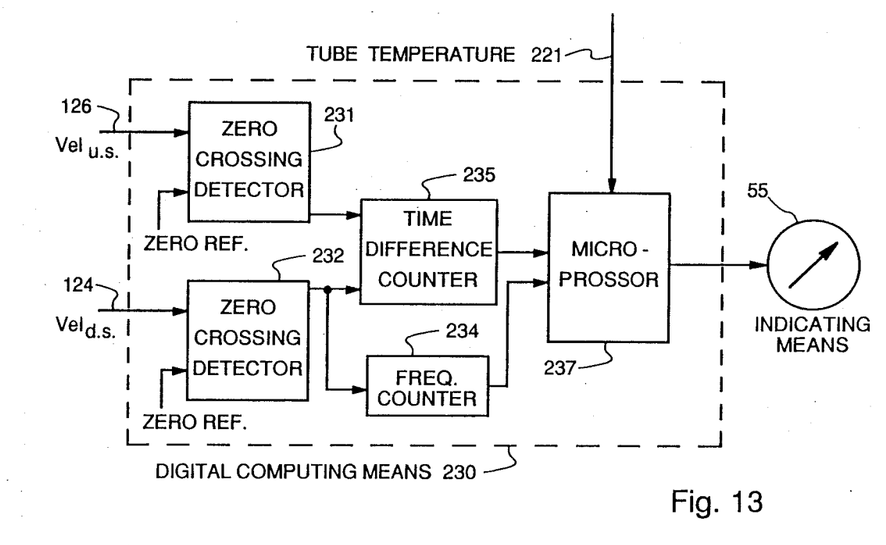
FIG. 13 schematically illustrates a digital implementation of the computing means.
Figure 14:
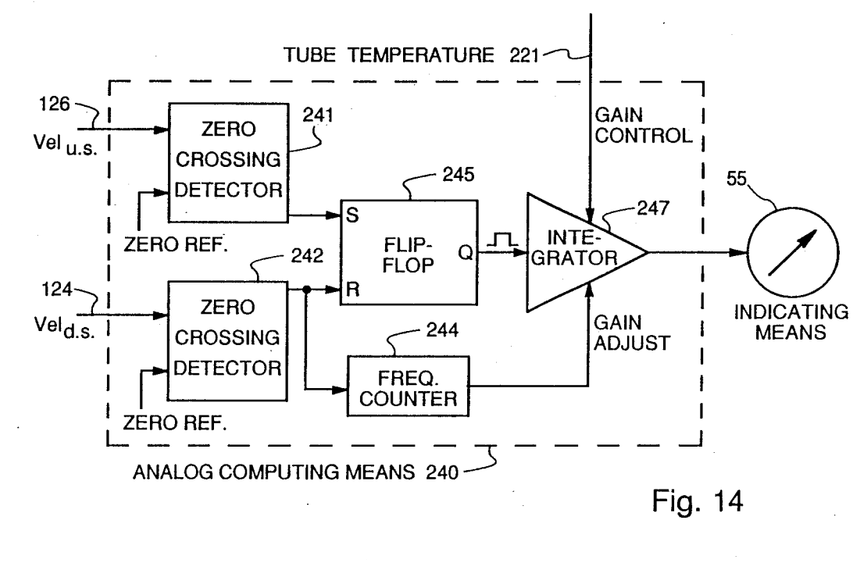
FIG. 14 schematically illustrates an analog implementation of the computing means.

Computing means 53 may be implemented, for example, by digital circuitry 230 as shown in FIG. 13, or by analog circuitry 240 as shown in FIG. 14. In the FIG. 13 digital computing means 230, downstream velocity signal $Vel_{ds}$ line 124 and upstream velocity signal $Vel_{us}$ line 126 are applied to respective waveform zero crossing detectors 232 and 231, which, upon detecting zero crossings, provides first and second signals, respectively, to processor means including time difference counter 235. Alternatively, waveform zero crossing detectors may be included in the velocity detecting means. Counter 235 measures the time difference between zeroes in (relative) velocity, which is applied, along with the tube temperature signal on line 221, to microprocessor 237. Microprocessor 237 calculates the mass flow rate according to equations 6 and/or 8 as explained above, and provides a mass flow rate measurement signal to indicating means 55.

In the FIG. 14 analog computing means 240, $Vel_{ds}$ line 124 and $Vel_{us}$ line 126 are applied to waveform zero crossing detectors 242 and 241, which provide first and second trigger signals to processor means flip flop 245 to the Reset terminal and to the Set terminal, respectively. Flip flop 245 has first and second predetermined values for thresholds of Set and Reset input signals. The Flip flop 245 Q output terminal provides a square wave output signal pulse which has a high value for an interval corresponding to the interval between zero value times of the $Vel_{us}$ and $Vel_{ds}$ signals. The output pulse value is integrated by integrator 247 with gain controlled by the temperature signal on line 221. Frequency measuring means 234 (FIG. 13) or 244 (FIG. 14) generates a signal proportional to the frequency of oscillation of the actuating means 42 (FIG. 2) or 60 (FIG. 3) and microprocessor 237 or integrator 247 uses the frequency signal to adjust its compution of the mass flow rate.

Although the present invention has been described by referring to several examples as illustrated in the drawing, it is to be understood that these illustration embodiments are not intended in any way to limit the appended claims, which should be interpreted as covering all embodiments, alterations and modifications which fall within the true spirit and scope of the invention.

What is claimed is:

1. A flow meter for measuring the mass flow rate of a flow of material, comprising:
    tubular conduit means arranged to receive, conduct and discharge said flow of material and having an entrance portion, an exit portion, an actuated portion, a first detection portion coupling said entrance portion to said actuated portion, and a second detection portion coupling said actuated portion to said exit portion;
    actuating means coupled to said actuated portion for applying forces causing said actuated portion to oscillate between positions on opposite sides of a rest position;

detecting means including first velocity sensor means coupled between said first detection portion and a reference, and including second velocity sensor means coupled between said second detection portion and a reference, said first and second velocity sensor means respectively producing first and second velocity signals indicative of the relative velocities of the corresponding detection portions;

means for measuring the temperature of said conduit means and for developing a temperature signal commensurate therewith; and computing and indicating means responsive to said velocity and temperature signals and operative to calculate and indicate the mass flow rate of the flow of material through said tubular conduit means using the formula $$F_{mass} = \frac{\tan\frac{\Delta\theta}{2}}{2KRw_D\left(\sin\theta - \cos\theta\tan\frac{\Delta\theta}{2}\right)}$$

where $\Delta\theta$ is the phase angle difference between zero values of output signals developed by said first and second velocity sensor means;

$$\theta = \frac{\pi}{2} - \arctan\frac{(2z_C W_D)}{w_C^2 - w_D^2};$$

K is a variable computed from measurement of the flow tube temperature;

$$R = \frac{w_C^2}{\sqrt{(w_C^2 - w_D^2)^2 + 4z_C^2 w_D^2}};$$

$W_D$ is the natural frequency of the tubular conduit means in a drive mode;

$W_C$ is the actual natural frequency of the tubular conduit means in a Coriolis mode; and $Z_C$ is the actual damping coefficient for the Coriolis mode.

2. A flow meter as recited in claim 1 wherein said tubular conduit means includes two lengths of conduit connected to form parallel flow paths and having corresponding parts disposed in spaced apart parallel relationship, and wherein said actuating means is coupled between, and serves to apply simultaneous equal and oppositely directed actuating forces to, the actuated portions of said two lengths of conduit.

3. A flow meter as recited in claim 2 wherein said first and second velocity sensor means each include electromagnetic windings and a permanent magnetic element magnetically coupled to said windings, said windings being rigidly secured to one of said lengths of conduit, and said magnetic element being rigidly secured to the other of said lengths of conduit.

4. A flow meter as recited in claim 1 wherein said tubular conduit means includes first and second loops wherein the exit portion of one loop is connected to the entrance portion of the other loop to form a serial flow path for said flow of material.

5. A flow meter for measuring the mass flow rate of a flow of material, comprising:

a pair of tubular conduit means arranged to form a plurality of loops each having an entrance portion, an exit portion spaced apart from and crossing said entrance portion, an actuated portion, a first detection portion coupling said entrance portion to said actuated portion, and a second detection portion coupling said actuated portion to said exit portion, said conduit means being adapted to receive, conduct and discharge emit said flow of material;

actuating means for causing said actuated portions to oscillate relative to each other;

detecting means for detecting the relative velocities of said entrance and exit portions as they are oscillated by said actuating means;

temperature measuring means for measuring the temperature of said conduit means; and computing and indicating means responsive to said detecting means and said temperature measuring means and operative to compute and to indicate the mass flow rate of a flow of material through said tubular conduit means, said computing and indicating means calculating the mass flow rate according to the formula $$F_{mass} = \frac{\tan\frac{\Delta\theta}{2}}{2KRw_D\left(\sin\theta - \cos\theta\tan\frac{\Delta\theta}{2}\right)}$$

where $\Delta\theta$ is the phase angle difference between the output signals developed by said first and second velocity sensor means;

$$\theta = \frac{\pi}{2} - \arctan\frac{(2z_C W_D)}{w_C^2 - w_D^2};$$

K is a variable computed from measuring the temperature of said conduit means;

$$R = \frac{w_C^2}{\sqrt{(w_C^2 - w_D^2)^2 + 4z_C^2 w_D^2}};$$

$W_D$ is the natural frequency of the tubular conduit means in a drive mode;

$W_C$ is the actual nature frequency of the tubular conduit means in a Coriolis mode; and $Z_C$ is the actual damping coefficient for the Coriolis mode.

6. A flow meter for measuring the mass flow rate of a flow of material, comprising:

tubular conduit means having an entrance portion, an exit portion, an actuated portion, a first detection portion coupling said entrance portion to said actuated portion, and a second detection portion coupling said actuated portion to said exit portion, said conduit means being adapted to receive, conduct and discharge said flow of material;

damping means coupled to said tubular conduit means for allowing selective adjustment of the damping coefficient thereof;

actuating means for oscillating said actuated portion from a rest position in opposite directions to deflection extreme positions;

velocity detecting means including first velocity sensor means for generating a first velocity signal representing the velocity of motion of said first detection portion, and second velocity sensor means for generating a second velocity signal representing the velocity of motion of said second detection portion; and computing and indicating means responsive to said first and second velocity signals and operative to detect first points in time when said first velocity signal has zero value and second points in time when said second velocity signal has zero value, said computing and indicating means being further operative to measure the time differences between said first and second points in time and to use such measurements to indicate the mass flow rate of a flow of material through said tubular conduit means.

* * * * *